US011933876B2

United States Patent
Zhang et al.

(10) Patent No.: US 11,933,876 B2
(45) Date of Patent: Mar. 19, 2024

(54) COMBINED FREQUENCY MODULATED CONTINUOUS WAVE RADAR DETECTION

(71) Applicant: QUALCOMM Incorporated, San Diego, CA (US)

(72) Inventors: Dan Zhang, San Diego, CA (US); Kapil Gulati, Belle Mead, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 17/302,203

(22) Filed: Apr. 27, 2021

(65) Prior Publication Data

US 2021/0389445 A1   Dec. 16, 2021

Related U.S. Application Data

(60) Provisional application No. 63/037,912, filed on Jun. 11, 2020.

(51) Int. Cl.
*G01S 13/34* (2006.01)
*G01S 7/35* (2006.01)
(Continued)

(52) U.S. Cl.
CPC .............. *G01S 13/347* (2013.01); *G01S 7/35* (2013.01); *G01S 13/584* (2013.01); *G01S 13/345* (2013.01); *G01S 13/931* (2013.01)

(58) Field of Classification Search
CPC ...... H04B 1/69; G01S 13/9054; G01S 13/284
See application file for complete search history.

(56) References Cited

U.S. PATENT DOCUMENTS 4,011,563 A  *  3/1977  Robbi .................... G01S 13/34
                                                    342/128
4,053,884 A  *  10/1977  Cantrell ............... G01S 13/284
                                                    342/132
(Continued)

FOREIGN PATENT DOCUMENTS

JP        2000206227 A      7/2000

OTHER PUBLICATIONS

P. Serafin, A. Kawalec and C. Leśnik, "Some issues of continuous wave synthetic aperture radar range resolution," 2012 13th International Radar Symposium, Warsaw, Poland, 2012, pp. 314-318, doi: 10.1109/IRS.2012.6233339. (Year: 2012).*

(Continued)

*Primary Examiner* — Bernarr E Gregory
(74) *Attorney, Agent, or Firm* — Harrity & Harrity, LLP

(57) ABSTRACT

Various aspects of the present disclosure generally relate to wireless communication. In some aspects, a radar device may transmit a combined frequency modulated continuous wave (FMCW) radar signal, wherein the combined FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values. The radar device may detect a radar target based at least in part on a received signal corresponding to the combined FMCW radar signal and perform an action based at least in part on detecting the radar target. Numerous other aspects are provided.

28 Claims, 6 Drawing Sheets

(51) Int. Cl.
    *G01S 13/58*     (2006.01)
    *G01S 13/931*     (2020.01)

(56) References Cited

U.S. PATENT DOCUMENTS

| | | | | |
|---|---|---|---|---|
| 6,396,436 | B1* | 5/2002 | Lissel | G01S 13/931 |
| | | | | 342/131 |
| 8,390,506 | B2* | 3/2013 | Focke | G01S 13/345 |
| | | | | 342/112 |
| 8,599,062 | B2* | 12/2013 | Szajnowski | G01S 13/345 |
| | | | | 342/104 |
| 9,024,809 | B2* | 5/2015 | Testar | G01S 13/343 |
| | | | | 342/128 |
| 10,855,328 | B1* | 12/2020 | Gulati | G01S 13/931 |
| 2003/0133496 | A1* | 7/2003 | Hooton | H04B 1/69 |
| | | | | 375/259 |
| 2006/0152403 | A1* | 7/2006 | Wicks | G01S 13/9054 |
| | | | | 342/25 R |
| 2017/0146648 | A1 | 5/2017 | Lim et al. | |

OTHER PUBLICATIONS

Aydogdu C., et al., "Radar Communications for Combating Mutual Interference of FMCW Radars," 2019 IEEE Radar Conference (RADARCONF), IEEE, Apr. 22, 2019, (Apr. 22, 2019), 6 pages, XP033616782, DOI: 10.1109/RADAR.2019.8835744 [retrieved on Sep. 12, 2019] abstract.
International Search Report and Written Opinion—PCT/US2021/070477—ISA/EPO—dated Aug. 31, 2021.

\* cited by examiner

COMBINED FREQUENCY MODULATED CONTINUOUS WAVE RADAR DETECTION

CROSS-REFERENCE TO RELATED APPLICATION

This Patent Application claims priority to U.S. Provisional Patent Application No. 63/037,912, filed on Jun. 11, 2020, entitled "COMBINED FREQUENCY MODULATED CONTINUOUS WAVE RADAR DETECTION," and assigned to the assignee hereof. The disclosure of the prior Application is considered part of and is incorporated by reference into this Patent Application.

FIELD OF THE DISCLOSURE

Aspects of the present disclosure generally relate to radar technologies and, for example, to combined frequency modulated continuous wave radar detection.

BACKGROUND

A radar device is a type of sensor device that may be used to detect a target, determine characteristics of the target, and/or the like. Radar devices may be used in vehicles and may be used to determine characteristics associated with the vehicle and/or characteristics associated with an environment of the vehicle. For example, a radar device may be configured to detect proximity to an object, roadway information, a location of the vehicle (e.g., relative to a target), and/or the like.

SUMMARY

In some aspects, a method, performed by a radar device, may include transmitting a combined frequency modulated continuous wave (FMCW) radar signal, wherein the FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; detecting a radar target based at least in part on a received signal corresponding to the combined FMCW radar signal; and performing an action based at least in part on detecting the radar target.

In some aspects, a radar device for wireless communication may include a memory and one or more processors coupled to the memory. The memory and the one or more processors may be configured to transmit a combined FMCW radar signal, wherein the combined FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; detect a radar target based at least in part on a received signal corresponding to the combined FMCW radar signal; and perform an action based at least in part on detecting the radar target.

In some aspects, a non-transitory computer-readable medium may store one or more instructions for wireless communication. The one or more instructions, when executed by one or more processors of a radar device, may cause the one or more processors to transmit a combined FMCW radar signal, wherein the combined FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; detect a radar target based at least in part on a received signal corresponding to the combined FMCW radar signal; and perform an action based at least in part on detecting the radar target.

In some aspects, an apparatus for wireless communication may include means for transmitting a combined FMCW radar signal, wherein the combined FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; means for detecting a radar target based at least in part on a received signal corresponding to the combined FMCW radar signal; and means for performing an action based at least in part on detecting the radar target.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
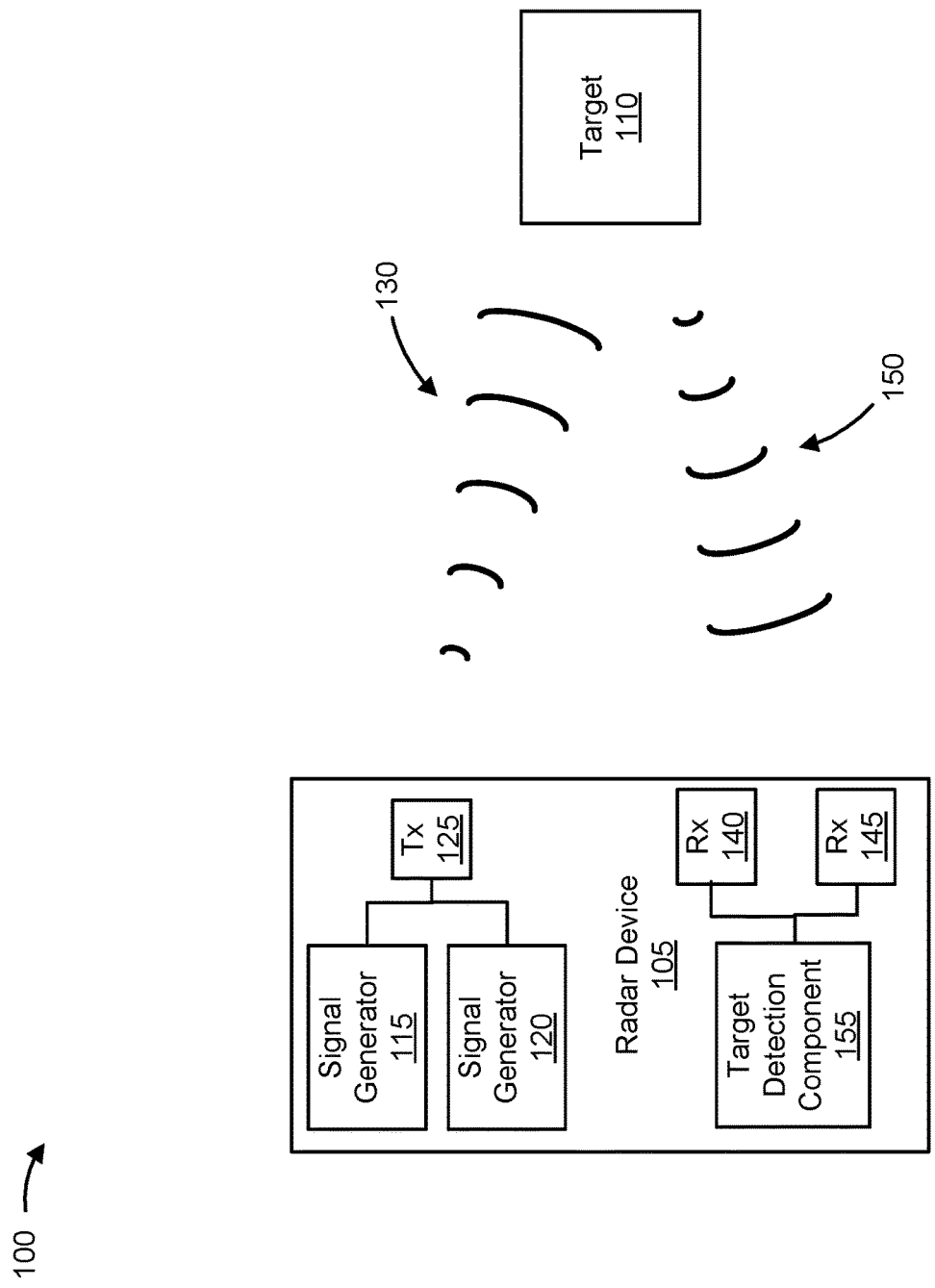
FIG. 1 is a diagram illustrating an example environment in which combined frequency modulated continuous wave (FMCW) radar signals described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, frequency modulated continuous wave (FMCW) radar may be used to detect particular targets. FMCW radar uses a linear frequency modulated signal to obtain range. A received signal is mixed with the transmitted signal to obtain the beat frequency between the two. The beat frequency is a function of the round-trip time to the reflecting target, and therefore can be mapped directly to its range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

In many instances, particularly when other nearby FMCW radar devices are being used, distinguishing between interference and real targets may be difficult. In some cases, this difficulty is due to the fact that a beat frequency, calculated based at least in part on a difference between instantaneous frequencies of the transmitted FMCW signal and a received interference signal, may be indistinguishable from a beat frequency associated with a reflective target. This may be particularly true where the interference signal is a transmitted FMCW chirp from another, nearby, radar device. As a result, a radar device may trigger unnecessary actions based on false detection of a target, fail to trigger actions that should be triggered in the presence of a target based on a failure to detect a target due to the presence of interference, transmit additional radar chirps in an attempt to distinguish a target thereby increasing processing and communication resource consumption, and/or the like.

Some implementations described herein enable use of a combined FMCW signal that includes a verification feature for more accurately distinguishing interference from targets. For example, a radar device may transmit a combined FMCW radar signal that includes a first FMCW radar chirp and a second FMCW radar chirp. The second FMCW radar chirp may be generated using a different transmission parameter value than the first FMCW radar chirp. A target may be detected by verifying the target based on components of a received signal that correspond to both chirps. In this way, aspects disclosed herein may facilitate distinguishing between interference and real targets with more reliability. Accordingly, such radar devices and techniques may improve roadway safety and/or prevent collisions involving vehicles equipped with FMCW radar devices to detect targets. Aspects of radar devices and techniques described herein may facilitate more efficient detection of targets and, as a result, cause a reduction in processing and communication resource consumption.

Although some examples are described herein in connection with one or more radar devices being used in a roadway environment, the one or more radar devices may similarly be utilized and/or designed for other types of example environments (e.g., marine environments, aerospace environments, and/or the like).

FIG. 1 is a diagram of an example environment 100 in which systems and/or methods described herein may be implemented. As shown in FIG. 1, environment 100 may include a radar device 105 and a target 110. In some aspects, the radar device 105 may be implemented as a sensor in a vehicle, mounted independently of a vehicle, and/or the like. The radar device 105 includes one or more devices capable of generating, transmitting, receiving, storing, processing, and/or providing information associated with transmitted FMCW radar signals, received signals, and/or the like. The target 110 may be any object capable of reflecting at least a portion of a radar signal.

As shown, the radar device 105 may include a first signal generator 115 that generates a first FMCW radar chirp. In some aspects, the first FMCW radar chirp may be generated based at least in part on a first set of transmission parameter values. A set of transmission parameter values may indicate a starting frequency, a slope (rate of change of frequency), an initial phase, a power, an amplitude, a periodicity (time interval between chirps), and/or the like.

The radar device 105 may also include a second signal generator 120 that generates a second FMCW radar chirp. In some aspects, the second FMCW radar chirp may be generated based at least in part on a second set of transmission parameter values. In some aspects, at least one transmission parameter value of the second set of transmission parameter values may be different than a corresponding transmission parameter value of the first set of transmission parameter values. In some aspects, the first FMCW radar chirp may be orthogonal to the second FMCW radar chirp. In some aspects, a first transmission power associated with the first FMCW radar chirp may be equal to a second transmission power associated with the second FMCW radar chirp. In some aspects, a first transmission power associated with the first FMCW radar chirp may not be equal to a second transmission power associated with the second FMCW radar chirp.

As shown in FIG. 1, the radar device 105 may include a transmit chain (Tx) 125 that generates and transmits a combined FMCW radar signal 130 based at least in part on the first FMCW radar chirp and the second FMCW radar chirp. In some aspects, the transmit chain 125 may include any type of transmission chain configured to combine two or more FMCW radar chirps and transmit the resulting combined radar signal 130. In some aspects, the transmit chain 125 may be configured to generate the combined FMCW radar signal 130 by summing the first FMCW radar chirp and the second FMCW radar chirp. In some aspects, the combined radar signal 130 may be based on more than two FMCW radar chirps and the radar device 105 may include more than two signal generators.

As shown in FIG. 1, the radar device 105 may include a number of receive chains (Rxs) 140, 145. In some aspects, the quantity of receive chains 140, 145 may correspond to the quantity of transmit chains, the quantity of signal generators, and/or the like. In some aspects, the receive chains 140 and 145 may be configured to receive a received signal 150, components of the received signal 150, and/or the like. As shown, for example, the received signal 150 may include a reflection, off of the target 110, of the transmitted combined FMCW radar signal 130. In some aspects, the received signal 150 may include one or more interference signals.

As shown in FIG. 1, the radar device 105 may include a target detection component 155 configured to detect the radar target 110 based at least in part on a received signal 150 corresponding to the combined FMCW radar signal 130. In some aspects, the target detection component 155 may be configured to detect the radar target 110 based at least in part on a first component of the received signal 150 corresponding to the first FMCW radar chirp and a second component of the received signal 150 corresponding to the second FMCW radar chirp. In some aspects, a first receive chain 140 receives the first component of the received signal 150 and a second receive chain 145 receives the second component of the received signal 150.

In some aspects, as described below in connection with FIG. 3, the target detection component 155 may detect the radar target 110 by determining a first beat frequency and a second beat frequency, and by determining that the first beat frequency is equal to, or at least approximately equal to (within a specified threshold of) the second beat frequency. In some aspects, the target detection component 155 may determine the first beat frequency based at least in part on a relationship between the first FMCW radar chirp and a first component of the received signal 150. In some aspects, the target detection component 155 may determine a second beat frequency based at least in part on a relationship between the second FMCW radar chirp and a second component of the received signal 150.

In some aspects, as described below in connection with FIG. 4, the target detection component 155 may detect the radar target 110 by determining that a first reception parameter value associated with a first component of the received signal 150 is equal to a second reception parameter value associated with a second component of the received signal 150. In some aspects, the first component of the received signal 150 may correspond to the first FMCW radar chirp and the second component of the received signal 150 may correspond to the second FMCW radar chirp.

In some aspects, the first reception parameter value may indicate a range corresponding to the first component of the received signal, a Doppler shift corresponding to the first component of the received signal, a direction of arrival corresponding to the first component of the received signal, a location of a representation of the radar target in a three-dimensional image, and/or the like. Similarly, the second reception parameter value may indicate a range corresponding to the second component of the received signal, a Doppler shift corresponding to the second component of the received signal, a direction of arrival corresponding to the second component of the received signal, a location of a representation of the radar target in a three-dimensional image, and/or the like.

In some aspects, the radar device 105 may perform an action based at least in part on detecting the radar target 110. For example, in some aspects, the radar device 105 may output an indication of the detection of the radar target 110. The output of the indication of the detection may be provided to a computing device, a sensor controller of a vehicle, a mobile device, an output device, and/or the like. In some aspects, the radar device 105 may output an instruction to a vehicle motion controller to take evasive action with respect to the target 110. According to various aspects of the disclosure, the radar device 105 may be configured to perform any number of different types of actions based at least in part on detecting the target 110.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
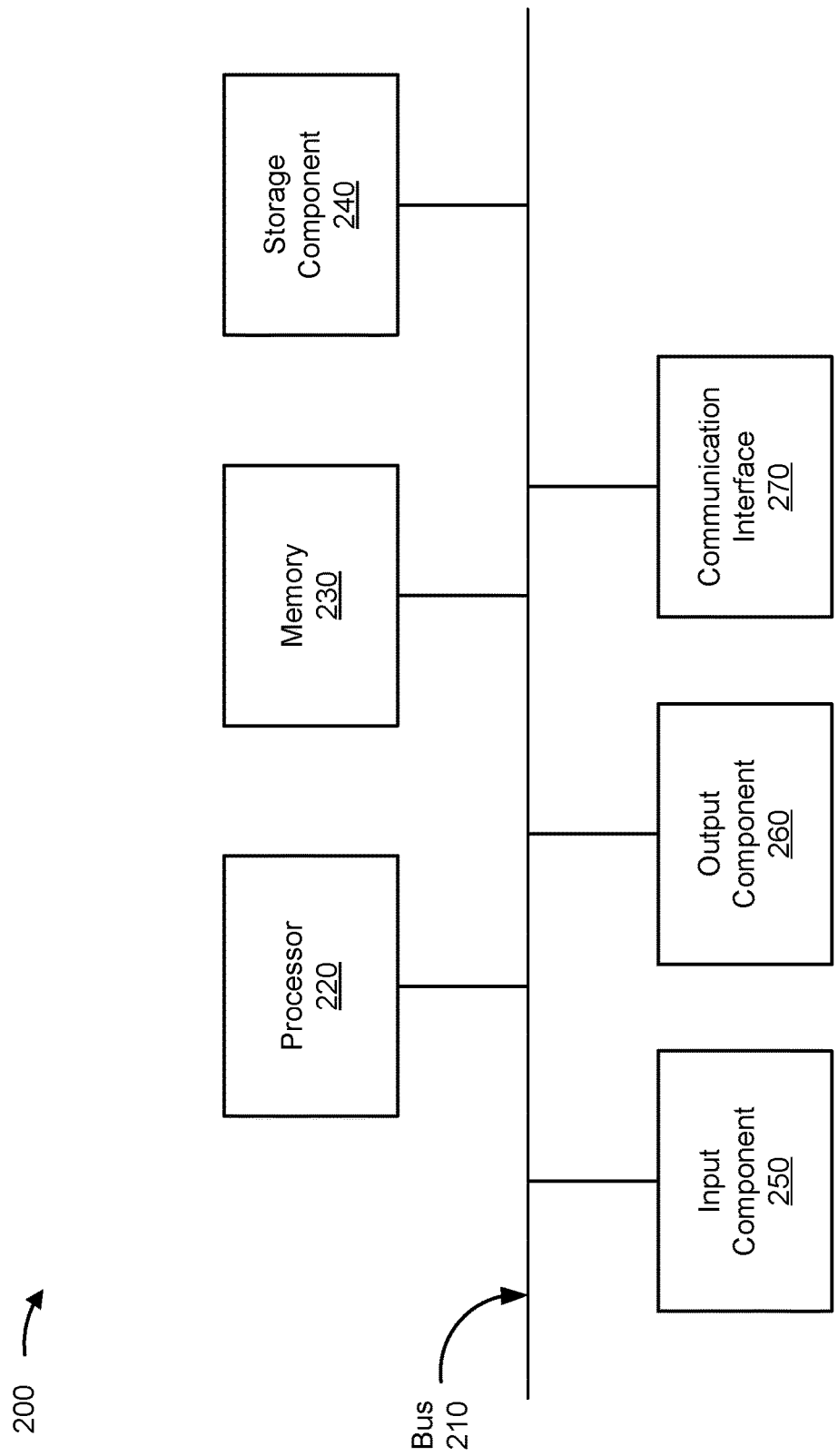
FIG. 2 is a diagram illustrating example components of one or more devices shown in FIG. 1, such as a radar device, in accordance with the present disclosure.

FIG. 2 is a diagram illustrating example components of a device 200, in accordance with the present disclosure. Device 200 may correspond to a radar device (e.g., the radar device 105 depicted in FIG. 1). In some aspects, the radar device 105 may include one or more devices 200 and/or one or more components of device 200. The device 200 may facilitate aspects of using a combined frequency modulated continuous wave (FMCW) radar signal to detect a target, as described below in connection with FIGS. 3-6. As shown in FIG. 2, device 200 may include a bus 210, a processor 220, a memory 230, a storage component 240, an input component 250, an output component 260, a communication interface 270, and/or the like.

The bus 210 includes a component that permits communication among the components of device 200. The processor 220 may be implemented in hardware, software, or a combination of hardware and software. The processor 220 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, the processor 220 may include one or more processors capable of being programmed to perform one or more functions. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of non-transitory computer-readable medium. The storage component 240 may include a non-transitory computer-readable medium along with a corresponding drive. In some aspects, the storage component 240 may include, be included in, or be integrated with the memory 230.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a component for determining a position or a location of the device 200 (e.g., a global positioning system (GPS) component, a global navigation satellite system (GNSS) component, and/or the like), a sensor for sensing information (e.g., an accelerometer, a gyroscope, an actuator, another type of position or environment sensor, and/or the like), and/or the like. In some aspects, the input component 250 may include a receive chain (e.g., the receive chain 140, the receive chain 145, and/or the like) and/or one or more components thereof, a target detection component (e.g., the target detection component 155) and/or one or more components thereof, and/or the like.

The output component 260 may include a component that provides output information from the device 200 (e.g., a display, a speaker, a haptic feedback component, an audio or visual indicator, and/or the like). In some aspects, the output component 260 may include a transmission chain (e.g., the transmission chain 125, and/or the like) and/or one or more components thereof, a signal generator (e.g., the signal generator 115, the signal generator 120, and/or the like) and/or one or more components thereof, and/or the like.

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet® interface, an optical interface, a coaxial interface, an infrared interface, a radio frequency interface, a universal serial bus (USB) interface, a wireless local area interface (e.g., a Wi-Fi® interface), a cellular network interface, and/or the like. In some aspects, the communication interface 270 may enable the device 200 to perform an action based at least in part on detecting a target, as described above in connection with FIG. 1.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or storage component 240 from another computer-readable medium or from another device via the communication interface 270. When executed, software instructions stored in the memory 230 and/or the storage component 240 may cause the processor 220 to perform one or more processes described herein. Thus, for example, software instructions may include, be included in, or otherwise contribute to the instantiation and function of a transmit chain (e.g., the transmit chain 125 and/or the like), a signal generator (e.g., the signal generator 115, the signal generator 120, and/or the like), a receive chain (e.g., the receive chain 140, the receive chain 145, and/or the like), a target detection component (e.g., the target detection component 155, and/or the like), and/or the like.

Additionally, or alternatively, hardwired circuitry may be used in place of, or in combination with, software instructions to perform one or more processes described herein. Thus, aspects described herein are not limited to any specific combination of hardware circuitry and/or software.

In some aspects, device 200 includes means for performing one or more processes described herein and/or means for performing one or more operations of the processes described herein. For example, device 200 may include means for transmitting a combined FMCW radar signal, wherein the combined FMCW radar signal comprises a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; means for detecting a radar target based at least in part on a received signal corresponding to the combined FMCW radar signal; means for performing an action based at least in part on detecting the radar target; and/or the like. In some aspects, such means may include one or more components of the device 200 described in connection with FIG. 2, such as the bus 210, the processor 220, the memory 230, the storage component 240, the input component 250, the output component 260, the communication interface 270, and/or the like.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
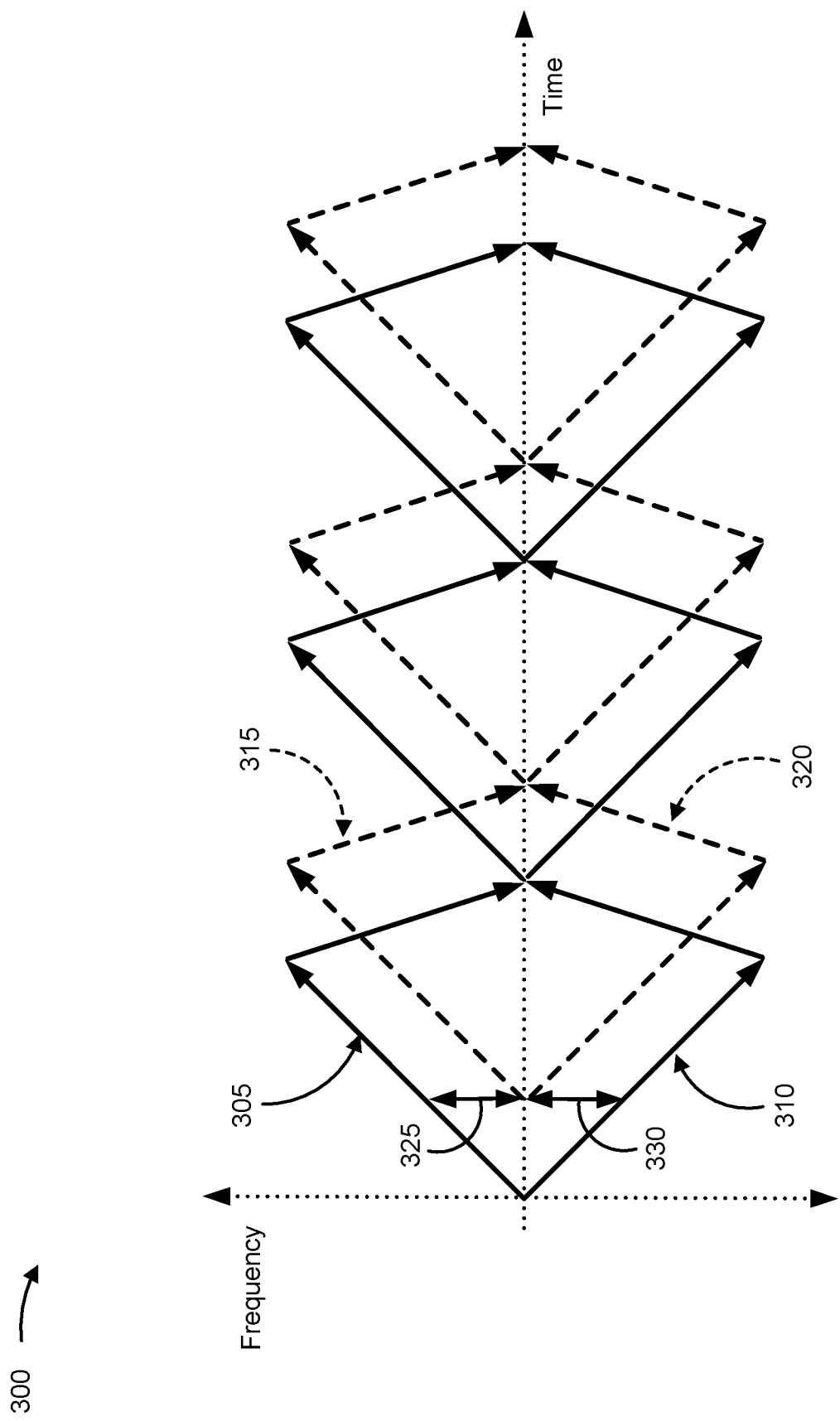
FIGS. 3-5 are diagrams illustrating examples associated with combined FMCW radar detection, in accordance with the present disclosure.

FIG. 3 is a diagram conceptually illustrating an example 300 associated with combined FMCW radar detection, in accordance with the present disclosure. Example 300 illustrates repetitions of a first FMCW chirp 305 (as shown by the solid arrows above the "time" axis) in terms of frequency over time, a second FMCW chirp 310 (as shown by the solid arrows below the "time" axis), a first component 315 of a received signal (as shown by the dashed arrows above the "time" axis), and a second component 320 of the received signal (as shown by the dashed arrows below the "time" axis).

In some aspects, for example, a single instance of the first FMCW chirp may be represented by a pair of arrows—a rising arrow representing an increase from a first frequency value to a second frequency value and an immediately subsequent falling arrow, indicating a decrease from the second frequency value to the first frequency value. Similarly, a single instance of the first component of the received signal may be represented by a pair of arrows—a rising arrow representing an increase from a first frequency value to a second frequency value, and an immediately subsequent falling arrow, indicating a decrease from the second frequency value to the first frequency value.

In some aspects, for example, a single instance of the second FMCW chirp may be represented by a pair of arrows—a falling arrow representing a decrease from a first frequency value to a second frequency value, and an immediately subsequent rising arrow, indicating an increase from the second frequency value to the first frequency value. Similarly, a single instance of the second component of the received signal may be represented by a pair of arrows—a falling arrow representing a decrease from a first frequency value to a second frequency value, and an immediately subsequent rising arrow, indicating an increase from the second frequency value to the first frequency value.

In some aspects, the first FMCW chirp 305 may be generated using a first signal generator (e.g., the first signal generator 115, and/or the like). In some aspects, the second FMCW chirp 310 may be generated using a second signal generator (e.g., the second signal generator 120, and/or the like). In some aspects, the first and second FMCW chirps 305 and 310 may be combined to create a combined FMCW radar signal, as described herein.

In some aspects, the first component 315 of the received signal may be received by a first receive chain (e.g., the receive chain 140, and/or the like). In some aspects, the second component 320 of the received signal may be received by a second receive chain (e.g., the receive chain 145, and/or the like). In some aspects, the first and second components 315 and 320 of the received signal may be used by a target detection component (e.g., the target detection component 155, and/or the like) to detect a target (e.g., the target 110, and/or the like).

For example, as shown in FIG. 3, the target detection component may determine a first beat frequency based at least in part on an instantaneous frequency difference 325 between the first FMCW radar chirp 305 and the first component 315 of the received signal. Similarly, the target detection component may determine a second beat frequency based at least in part on an instantaneous frequency difference 330 between the second FMCW radar chirp 310 and the second component 320 of the received signal. In some aspects, the target detection component may detect a target by determining that the first beat frequency is equal to (or within a specified threshold of) the second beat frequency.

As indicated above, FIG. 3 is provided merely as one or more examples. Other examples may differ from what is described with regard to FIG. 3.

Figure 4:
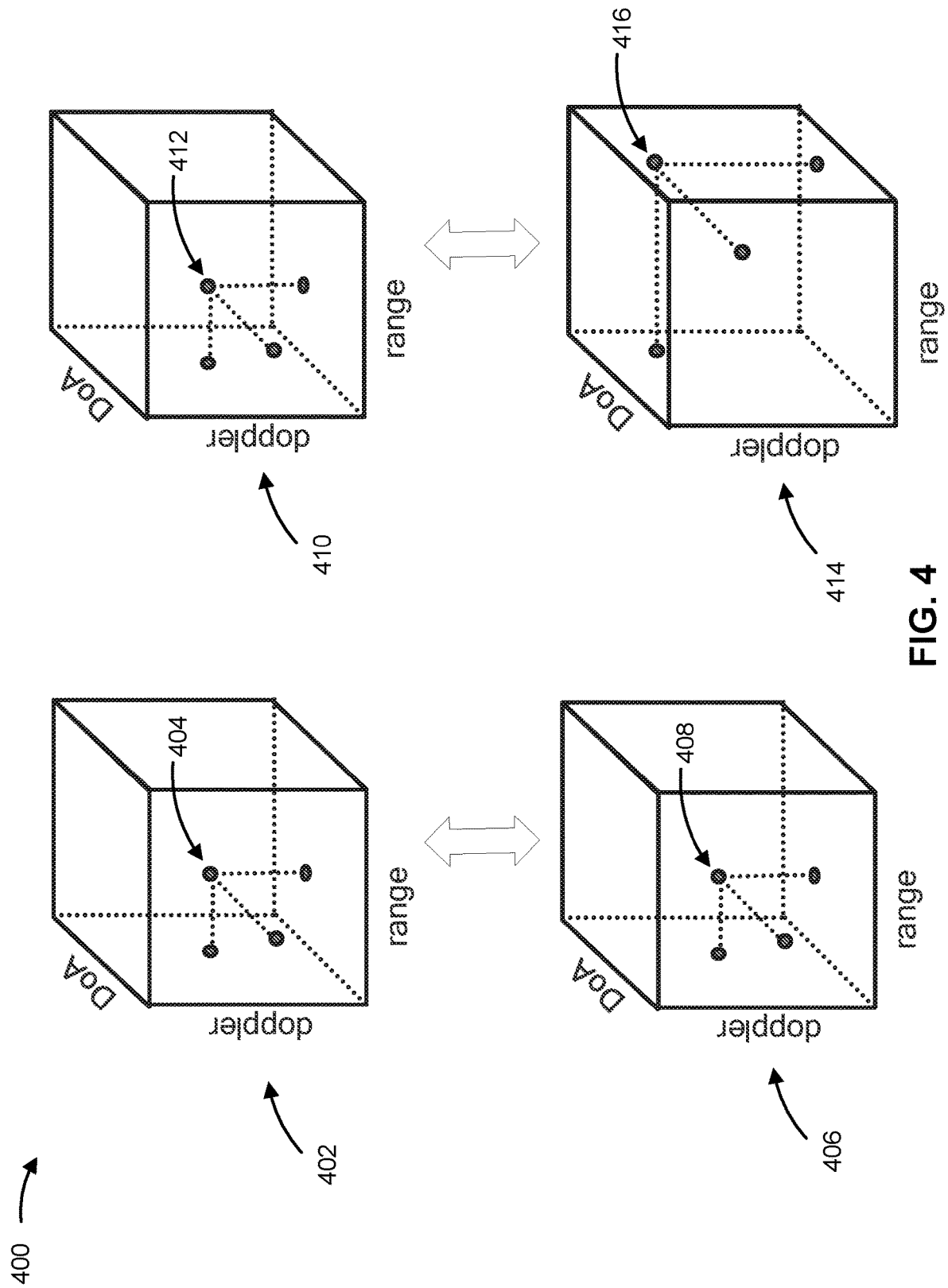

FIG. 4 is a diagram conceptually illustrating an example 400 associated with combined FMCW radar detection, in accordance with the present disclosure. As shown, example 400 includes a three-dimensional (3D) image 402 of a three-dimensional representation of a first target location 404 associated with a target detected based at least in part on a first component (e.g., the first component 315, and/or the like) of a received signal. Example 400 also includes a 3D image 406 of a three-dimensional representation of a second target location 408 associated with a target detected based at least in part on a second component (e.g., the second component 320, and/or the like) of a received signal.

As shown, the first target location 404 may include a vector that may include a range corresponding to the first component of the received signal, a Doppler shift corresponding to the first component of the received signal, a direction of arrival (DoA) corresponding to the first component of the received signal, and/or the like. Similarly, the second target location 408 may include a vector that may include a range corresponding to the second component of the received signal, a Doppler shift corresponding to the second component of the received signal, a DoA corresponding to the second component of the received signal, and/or the like.

In some aspects, a target detection component (e.g., the target detection component 155, and/or the like) may detect the radar target by determining that a first reception parameter value associated with a first component of the received signal corresponding to the first FMCW radar chirp is equal to (or within a specified threshold of) a second reception parameter value associated with a second component of the received signal corresponding to the second FMCW radar chirp. That is, as shown, for example, the target detection component may detect a radar target by determining that one or more values of one or more of the parameters represented in the 3D image 402 is equal to (or within a specified threshold of) one or more values of one or more parameters represented in the 3D image 406.

As shown, example 400 also includes a 3D image 410 of a representation of a first target location 412 associated with a target detected based at least in part on a first component of a received signal and a 3D image 414 of a representation of a second target location 416 associated with a target detected based at least in part on a second component of a received signal. As shown, the first target location 412 may include a vector that may include a range corresponding to the first component of the received signal, a Doppler shift corresponding to the first component of the received signal, a direction of arrival (DoA) corresponding to the first component of the received signal, and/or the like. Similarly, the second target location 416 may include a vector that may include a range corresponding to the second component of the received signal, a Doppler shift corresponding to the second component of the received signal, a DoA corresponding to the second component of the received signal, and/or the like.

In some aspects, as shown, a target detection component may fail to detect a radar target by determining that a first reception parameter value associated with a first component of the received signal corresponding to the first FMCW radar chirp is not equal to (or is not within a specified threshold of) a second reception parameter value associated with a second component of the received signal corresponding to the second FMCW radar chirp. That is, as shown, for example, the target detection component may fail to detect a radar target by determining that one or more values of one or more of the parameters represented in the 3D image 410 is not equal to (or is not within a specified threshold of) one or more values of one or more parameters represented in the 3D image 414.

As indicated above, FIG. 4 is provided merely as one or more examples. Other examples may differ from what is described with regard to FIG. 4.

Figure 5:
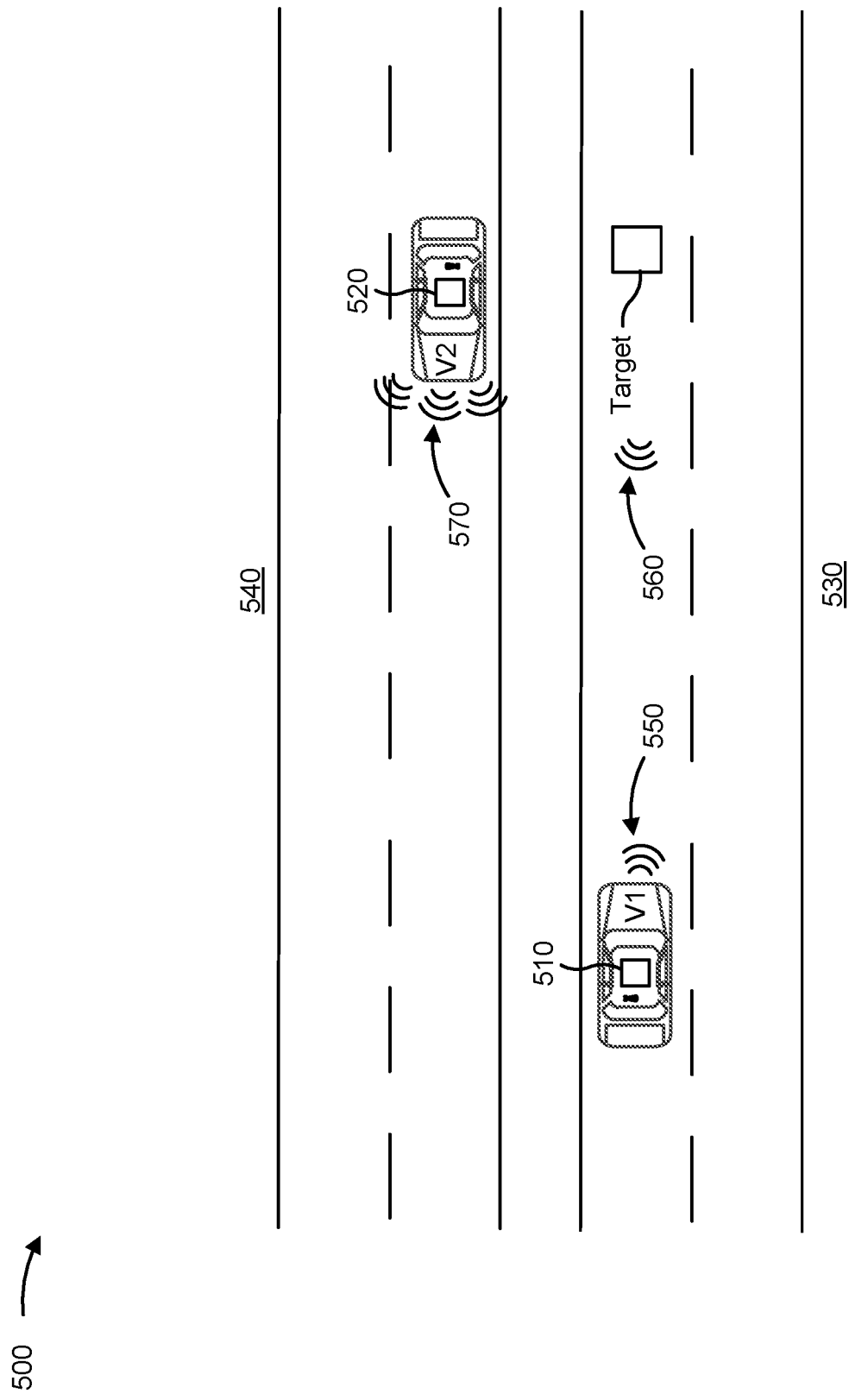

FIG. 5 is a diagram conceptually illustrating an example 500 associated with combined FMCW radar detection, in accordance with the present disclosure. Example 500 includes a first vehicle ("V1"), and a second vehicle ("V2"). As shown, the first vehicle includes a first radar device 510 (e.g., the radar device 105, and/or the like) and the second vehicle includes a second radar device 520 (e.g., the radar device 105, and/or the like). As shown, the first vehicle is traveling on a first roadway 530 that includes a target, and the second vehicle is traveling on a second roadway 540 that is adjacent to the first roadway.

The first vehicle and/or the second vehicle may include any vehicle that includes a radar device as described herein. For example, the first vehicle and/or the second vehicle may be a consumer vehicle, an industrial vehicle, a commercial vehicle, and/or the like. The first vehicle and/or the second vehicle may be capable of traveling and/or providing transportation via public roadways, may be capable of use in operations associated with a worksite (e.g., a construction site), and/or the like. The first vehicle and/or the second vehicle may be controlled autonomously and/or semi-autonomously. Additionally, or alternatively, the first vehicle and/or the second vehicle may be controlled by an operator.

As described herein, the radar device 510 may transmit a combined FMCW radar signal 550 to detect the targets. The radar device 510 may receive a received signal 560 that is a reflection of the transmitted combined FMCW radar signal 550. By utilizing combined FMCW radar detection as described herein, the radar device 510 may detect the target and differentiate the received signal 560 from an interference signal 570 that may be generated, for example, by the radar device 520. In this way, the vehicles (and/or radar devices of the vehicles) may detect targets as the vehicles approach the targets.

As indicated above, FIG. 5 is provided merely as one or more examples. Other examples may differ from what is described with regard to FIG. 5.

Figure 6:
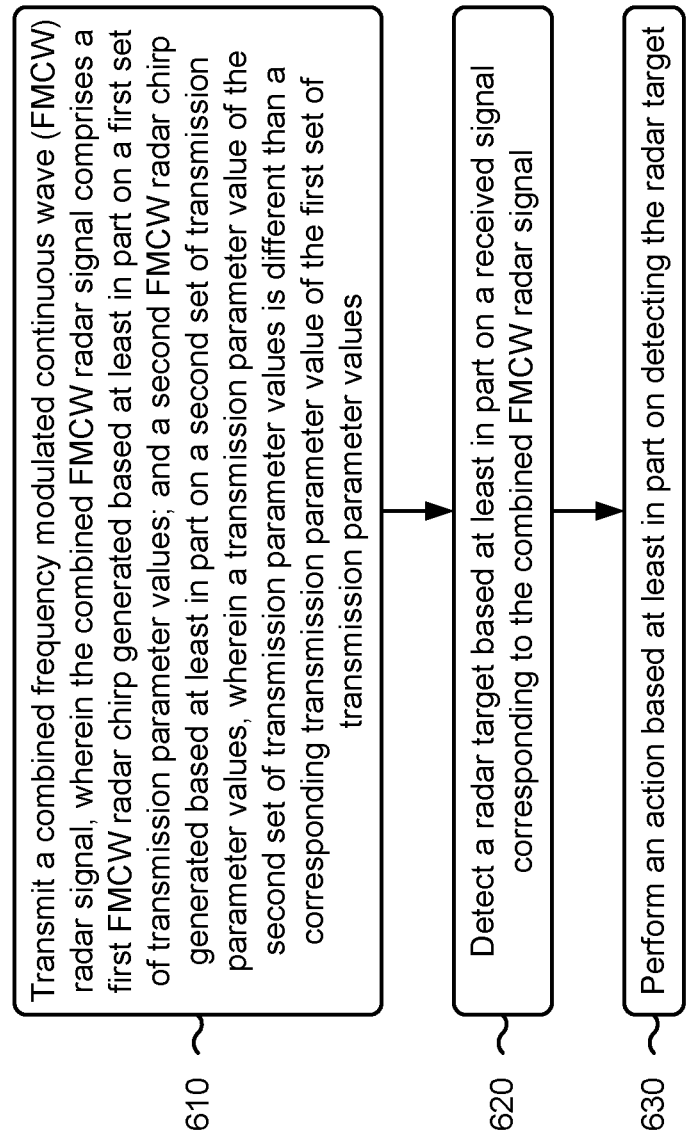
FIG. 6 is a flow chart of an example process associated with combined FMCW radar detection, in accordance with the present disclosure.

FIG. 6 is a diagram illustrating an example process 600 performed, for example, by a radar device, in accordance with the present disclosure. Example process 600 is an example where the radar device (e.g., the radar device 105 and/or the like) performs operations associated with combined FMCW radar detection.

As shown in FIG. 6, in some aspects, process 600 may include transmitting a combined FMCW radar signal, wherein the combined FMCW radar signal comprises a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values (block 610). For example, the radar device (e.g., using signal generator 115, signal generator 120, transmit chain 125, processor 220, memory 230, storage component 240, output component 260, and/or the like) may transmit a combined FMCW radar signal, as described above. In some aspects, the combined FMCW radar signal comprises a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values, as described above in connection with FIGS. 1-5.

As further shown in FIG. 6, in some aspects, process 600 may include detecting a radar target based at least in part on a received signal corresponding to the combined FMCW radar signal (block 620). For example, the radar device (e.g., using receive chain 140, receive chain 145, target detection component 155, processor 220, memory 230, storage component 240, input component 250, and/or the like) may detect a radar target based at least in part on a received signal corresponding to the combined FMCW radar signal, as described above in connection with FIGS. 1-5.

As further shown in FIG. 6, in some aspects, process 600 may include performing an action based at least in part on detecting the radar target (block 630). For example, the radar device (e.g., using processor 220, memory 230, storage component 240, input component 250, output component 260, communication interface 270, and/or the like) may perform an action based at least in part on detecting the radar target, as described above.

Process 600 may include additional aspects, such as any single aspect or any combination of aspects described below and/or in connection with one or more other processes described elsewhere herein.

In a first aspect, process 600 includes generating the combined FMCW radar signal by summing the first FMCW radar chirp and the second FMCW radar chirp.

In a second aspect, alone or in combination with the first aspect, the first FMCW radar chirp is orthogonal to the second FMCW radar chirp.

In a third aspect, alone or in combination with one or more of the first and second aspects, a first transmission power associated with the first FMCW radar chirp is equal to a second transmission power associated with the second FMCW radar chirp.

In a fourth aspect, alone or in combination with one or more of the first through third aspects, a first transmission power associated with the first FMCW radar chirp is not equal to a second transmission power associated with the second FMCW radar chirp.

In a fifth aspect, alone or in combination with one or more of the first through fourth aspects, detecting the radar target comprises: detecting the radar target based at least in part on a first component of the received signal corresponding to the first FMCW radar chirp, and detecting the radar target based at least in part on a second component of the received signal corresponding to the second FMCW radar chirp.

In a sixth aspect, alone or in combination with one or more of the first through fifth aspects, detecting the radar target comprises: determining a first beat frequency based at least in part on a relationship between the first FMCW radar chirp and a first component of the received signal, determining a second beat frequency based at least in part on a relationship between the second FMCW radar chirp and a second component of the received signal, and determining that the first beat frequency is equal to the second beat frequency. Determining that the first beat frequency is equal to the second beat frequency may include determining that the first beat frequency is within a specified threshold of the second beat frequency.

In a seventh aspect, alone or in combination with one or more of the first through sixth aspects, detecting the radar target comprises determining that a first reception parameter value associated with a first component of the received signal corresponding to the first FMCW radar chirp is equal to a second reception parameter value associated with a second component of the received signal corresponding to the second FMCW radar chirp. Determining that the first reception parameter value is equal to the second reception parameter value may include determining that the first reception parameter value is within a specified threshold of the second reception parameter value.

In an eighth aspect, alone or in combination with one or more of the first through seventh aspects, the first reception parameter value indicates at least one of a range corresponding to the first component of the received signal, a Doppler shift corresponding to the first component of the received signal, a DoA corresponding to the first component of the received signal, a location of a representation of the radar target in a 3D image, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method performed by a radar device, comprising: transmitting a combined frequency modulated continuous wave (FMCW) radar signal, wherein the combined FMCW radar signal comprises: a first FMCW radar chirp generated based at least in part on a first set of transmission parameter values; and a second FMCW radar chirp generated based at least in part on a second set of transmission parameter values, wherein a transmission parameter value of the second set of transmission parameter values is different than a corresponding transmission parameter value of the first set of transmission parameter values; detecting a radar target based at least in part on a received signal corresponding to the combined FMCW radar signal; and performing an action based at least in part on detecting the radar target.

Aspect 2: The method of Aspect 1, further comprising generating the combined FMCW radar signal by summing the first FMCW radar chirp and the second FMCW radar chirp.

Aspect 3: The method of either of Aspects 1 or 2, wherein the first FMCW radar chirp is orthogonal to the second FMCW radar chirp.

Aspect 4: The method of any of Aspects 1-3, wherein a first transmission power associated with the first FMCW radar chirp is equal to a second transmission power associated with the second FMCW radar chirp.

Aspect 5: The method of any of Aspects 1-3, wherein a first transmission power associated with the first FMCW radar chirp is not equal to a second transmission power associated with the second FMCW radar chirp.

Aspect 6: The method of any of Aspects 1-5, wherein detecting the radar target comprises: detecting the radar target based at least in part on a first component of the received signal corresponding to the first FMCW radar chirp; and detecting the radar target based at least in part on a second component of the received signal corresponding to the second FMCW radar chirp.

Aspect 7: The method of any of Aspects 1-6, wherein detecting the radar target comprises: determining a first beat frequency based at least in part on a relationship between the first FMCW radar chirp and a first component of the received signal; determining a second beat frequency based at least in part on a relationship between the second FMCW radar chirp and a second component of the received signal; and determining that the first beat frequency is equal to the second beat frequency.

Aspect 8: The method of any of Aspects 1-7, wherein detecting the radar target comprises determining that a first reception parameter value associated with a first component of the received signal corresponding to the first FMCW radar chirp is equal to a second reception parameter value associated with a second component of the received signal corresponding to the second FMCW radar chirp.

Aspect 9: The method of Aspect 8, wherein the first reception parameter value indicates at least one of: a range corresponding to the first component of the received signal, a Doppler shift corresponding to the first component of the received signal, a direction of arrival corresponding to the first component of the received signal, a location of a representation of the radar target in a three-dimensional image, or a combination thereof.

Aspect 10: An apparatus for wireless communication at a device, comprising a processor; memory coupled with the processor; and instructions stored in the memory and executable by the processor to cause the apparatus to perform the method of one or more Aspects of Aspects 1-9.

Aspect 11: A device for wireless communication, comprising a memory and one or more processors coupled to the memory, the memory and the one or more processors configured to perform the method of one or more Aspects of Aspects 1-9.

Aspect 12: An apparatus for wireless communication, comprising at least one means for performing the method of one or more Aspects of Aspects 1-9.

Aspect 13: A non-transitory computer-readable medium storing code for wireless communication, the code comprising instructions executable by a processor to perform the method of one or more Aspects of Aspects 1-9.

Aspect 14: A non-transitory computer-readable medium storing a set of instructions for wireless communication, the set of instructions comprising one or more instructions that, when executed by one or more processors of a device, cause the device to perform the method of one or more Aspects of Aspects 1-9.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a radar device, comprising:
transmitting a combined frequency modulated continuous wave (FMCW) radar signal, wherein the combined FMCW radar signal comprises:
 a first FMCW radar chirp generated using a first signal generator based at least in part on a first set of transmission parameter values; and
 a second FMCW radar chirp generated using a second signal generator based at least in part on a second set of transmission parameter values;
receiving a signal corresponding to the combined FMCW radar signal;
detecting a radar target by determining whether a first parameter value associated with a first component of the received signal is within a threshold of a second parameter value associated with a second component of the received signal,
 wherein the radar target is distinguished from interference by verifying that the first component of the received signal and the second component of the received signal correspond to the first FMCW radar chirp and the second FMCW radar chirp; and
performing an action based at least in part on detecting the radar target.

2. The method of claim 1, further comprising generating the combined FMCW radar signal by summing the first FMCW radar chirp and the second FMCW radar chirp.

3. The method of claim 1, wherein the first FMCW radar chirp is orthogonal to the second FMCW radar chirp.

4. The method of claim 1, wherein a first transmission power associated with the first FMCW radar chirp is equal to a second transmission power associated with the second FMCW radar chirp.

5. The method of claim 1, wherein a first transmission power associated with the first FMCW radar chirp is not equal to a second transmission power associated with the second FMCW radar chirp.

6. The method of claim 1, wherein detecting the radar target comprises:
determining a first beat frequency based at least in part on a relationship between the first FMCW radar chirp and the first component of the received signal;
determining a second beat frequency based at least in part on a relationship between the second FMCW radar chirp and the second component of the received signal; and
determining that the first beat frequency is equal to the second beat frequency.

7. The method of claim 1, wherein detecting the radar target comprises determining that the first parameter value is equal to the second parameter value.

8. The method of claim 1, wherein the first parameter value indicates at least one of:
a range corresponding to the first component of the received signal,
a Doppler shift corresponding to the first component of the received signal,
a direction of arrival corresponding to the first component of the received signal,
a location of a representation of the radar target in a three-dimensional image, or
a combination thereof.

9. The method of claim 1, wherein the first parameter value corresponds to the first FMCW radar chirp and the second parameter value corresponds to the second FMCW radar chirp.

10. A radar device for wireless communication, comprising:
a memory; and
one or more processors coupled to the memory, the memory and the one or more processors configured to:
 transmit a combined frequency modulated continuous wave (FMCW) radar signal, wherein the combined FMCW radar signal comprises:
  a first FMCW radar chirp generated using a first signal generator based at least in part on a first set of transmission parameter values; and
  a second FMCW radar chirp generated using a second signal generator based at least in part on a second set of transmission parameter values;
 receive a signal corresponding to the combined FMCW radar signal;
 detect a radar target by determining whether a first parameter value associated with a first component of the received signal is within a threshold of a second parameter value associated with a second component of the received signal,
  wherein the radar target is distinguished from interference by verifying that the first component of the received signal and the second component of the received signal correspond to the first FMCW radar chirp and the second FMCW radar chirp; and
 perform an action based at least in part on detecting the radar target.

11. The radar device of claim 10, wherein the memory and the one or more processors are further configured to generate the combined FMCW radar signal by summing the first FMCW radar chirp and the second FMCW radar chirp.

12. The radar device of claim 10, wherein the first FMCW radar chirp is orthogonal to the second FMCW radar chirp.

13. The radar device of claim 10,
wherein a first transmission power associated with the first FMCW radar chirp is equal to a second transmission power associated with the second FMCW radar chirp.

14. The radar device of claim 10,
wherein a first transmission power associated with the first FMCW radar chirp is not equal to a second transmission power associated with the second FMCW radar chirp.

15. The radar device of claim 10, wherein the memory and the one or more processors are configured to detect the radar target by
determining a first beat frequency based at least in part on a relationship between the first FMCW radar chirp and the first component of the received signal;
determining a second beat frequency based at least in part on a relationship between the second FMCW radar chirp and the second component of the received signal; and
determining that the first beat frequency is equal to the second beat frequency.

16. The radar device of claim 10, wherein the memory and the one or more processors are configured to detect the radar target by determining that the first parameter value is equal to the second parameter value.

17. The radar device of claim 10,
wherein the first reception parameter value indicates at least one of:
a range corresponding to the first component of the received signal,
a Doppler shift corresponding to the first component of the received signal,
a direction of arrival corresponding to the first component of the received signal,
a location of a representation of the radar target in a three-dimensional image, or
a combination thereof.

18. The radar device of claim 10, wherein the first parameter value corresponds to the first FMCW radar chirp and the second parameter value corresponds to the second FMCW radar chirp.

19. A non-transitory computer-readable medium storing one or more instructions for wireless communication, the one or more instructions comprising:
one or more instructions that, when executed by one or more processors of a radar device, cause the one or more processors to:
transmit a combined frequency modulated continuous wave (FMCW) radar signal, wherein the combined FMCW radar signal comprises:
a first FMCW radar chirp generated using a first signal generator based at least in part on a first set of transmission parameter values; and
a second FMCW radar chirp generated using a second signal generator based at least in part on a second set of transmission parameter values;
receive a signal corresponding to the combined FMCW radar signal;
detect a radar target by determining whether a first parameter value associated with a first component of the received signal is within a threshold of a second parameter value associated with a second component of the received signal,
wherein the radar target is distinguished from interference by verifying that the first component of the received signal and the second component of the received signal correspond to the first FMCW radar chirp and the second FMCW radar chirp; and
perform an action based at least in part on detecting the radar target.

20. The non-transitory computer-readable medium of claim 19, wherein the one or more instructions further cause the radar device to generate the combined FMCW radar signal by summing the first FMCW radar chirp and the second FMCW radar chirp.

21. The non-transitory computer-readable medium of claim 19, wherein the first FMCW radar chirp is orthogonal to the second FMCW radar chirp.

22. The non-transitory computer-readable medium of claim 19, wherein a first transmission power associated with the first FMCW radar chirp is equal to a second transmission power associated with the second FMCW radar chirp.

23. The non-transitory computer-readable medium of claim 19, wherein a first transmission power associated with the first FMCW radar chirp is not equal to a second transmission power associated with the second FMCW radar chirp.

24. The non-transitory computer-readable medium of claim 19, wherein the one or more instructions, that cause the radar device to detect the radar target, cause the radar device to:
determine a first beat frequency based at least in part on a relationship between the first FMCW radar chirp and the first component of the received signal;
determine a second beat frequency based at least in part on a relationship between the second FMCW radar chirp and the second component of the received signal; and
determine that the first beat frequency is equal to the second beat frequency.

25. The non-transitory computer-readable medium of claim 19, wherein the one or more instructions, that cause the radar device to detect the radar target, cause the radar device to determine that the first parameter value is equal to the second parameter value.

26. The non-transitory computer-readable medium of claim 19, wherein the first parameter value indicates at least one of:
a range corresponding to the first component of the received signal,
a Doppler shift corresponding to the first component of the received signal,
a direction of arrival corresponding to the first component of the received signal,
a location of a representation of the radar target in a three-dimensional image, or
a combination thereof.

27. The non-transitory computer-readable medium of claim 19, wherein the first parameter value corresponds to the first FMCW radar chirp and the second parameter value corresponds to the second FMCW radar chirp.

28. An apparatus for wireless communication, comprising:
means for transmitting a combined frequency modulated continuous wave (FMCW) radar signal, wherein the combined FMCW radar signal comprises:
a first FMCW radar chirp generated using a first signal generator based at least in part on a first set of transmission parameter values; and
a second FMCW radar chirp generated using a second signal generator based at least in part on a second set of transmission parameter values;
means for receiving a signal corresponding to the combined FMCW radar signal;
means for detecting a radar target by determining whether a first parameter value associated with a first component of the received signal is within a threshold of a second parameter value associated with a second component of the received signal,
wherein the radar target is distinguished from interference by verifying that the first component of the received signal and the second component of the received signal correspond to the first FMCW radar chirp and the second FMCW radar chirp; and means for performing an action based at least in part on detecting the radar target.

* * * * *